(12) United States Patent
Givol et al.

(10) Patent No.: US 11,113,711 B2
(45) Date of Patent: *Sep. 7, 2021

(54) INTRA-TRANSACTION ACCOUNT GENERATION

(71) Applicant: Capital One Services, LLC, McLean, VA (US)

(72) Inventors: Dan Givol, Arlington, VA (US); Lukiih Cuan, Arlington, VA (US); Michelle Olenoski, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/674,382

(22) Filed: Nov. 5, 2019

(65) Prior Publication Data

US 2020/0074494 A1 Mar. 5, 2020

Related U.S. Application Data

(63) Continuation of application No. 15/880,224, filed on Jan. 25, 2018, now Pat. No. 10,475,061.

(51) Int. Cl.
*G06Q 30/02* (2012.01)
*G06Q 20/34* (2012.01)
*G06Q 20/36* (2012.01)

(52) U.S. Cl.
CPC ....... *G06Q 30/0226* (2013.01); *G06Q 20/351* (2013.01); *G06Q 20/36* (2013.01); *G06Q 30/0207* (2013.01)

(58) Field of Classification Search
None
See application file for complete search history.

(56) References Cited

U.S. PATENT DOCUMENTS 6,018,718 A 1/2000 Walker et al.
10,475,061 B2 11/2019 Givol
(Continued)

OTHER PUBLICATIONS

E. Tom Anderson, "Do digital wallets stiff you on reward points?", available on May 25, 2015, retrieved from https://www.cnbc.com/2015/05/28/do-digital-wallets-stiff-you-on-reward-points.html (Year: 2015).*

(Continued)

*Primary Examiner* — Sam Refai
(74) *Attorney, Agent, or Firm* — Harrity & Harrity, LLP (57) ABSTRACT

A device may receive transaction information related to a transaction that an individual is completing. The transaction information may identify a location of the transaction and the individual that is completing the transaction. The device may determine, prior to completing the transaction and based on data from a sensor of a transaction terminal or from a user device associated with the individual, that the individual did not use a benefit account associated with the location in association with completing the transaction. The benefit account may be a rewards account, a loyalty account, or a discount account. The device may perform an action to facilitate use of the benefit account in association with completing the transaction. The action may be performed prior to completing the transaction. The device may perform another action to complete the transaction after performing the action to facilitate use of the benefit account.

20 Claims, 5 Drawing Sheets

(56) References Cited

U.S. PATENT DOCUMENTS

| | | | |
|---|---|---|---|
| 2002/0194069 A1* | 12/2002 | Thakur | G06Q 30/02 |
| | | | 705/14.18 |
| 2010/0076833 A1 | 3/2010 | Nelsen et al. | |
| 2010/0082420 A1 | 4/2010 | Trifiletti et al. | |
| 2012/0101881 A1 | 4/2012 | Taylor et al. | |
| 2013/0080239 A1 | 3/2013 | Okerlund et al. | |
| 2013/0268333 A1 | 10/2013 | Ovick et al. | |
| 2015/0287085 A1* | 10/2015 | Windmueller | G06Q 30/0267 |
| | | | 705/14.58 |
| 2016/0005009 A1* | 1/2016 | Li | G06Q 20/327 |
| | | | 705/71 |
| 2017/0249632 A1* | 8/2017 | von Behren | G06Q 20/047 |

OTHER PUBLICATIONS

Android Pay Help, "Use Loyalty Cards, Gift Cards, or Offers," https://support.google.com/androidpay/answer/6289384?=en, Oct. 26, 2016, 2 pages.

Apple Store Preview, https://itunes.apple.com/us/app/stocard-rewards-cards-wallet/id444578884?mt=8, Jan. 23, 2018, 2 pages.

Caldwell S., "How to Use Rewards Cards with Apple Pay and the Wallet App," https://www.imore.com/how-use-rewards-cards-apple-pay-and-wallet-app, Jan. 25, 2017, 12 pages.

\* cited by examiner

INTRA-TRANSACTION ACCOUNT GENERATION

RELATED APPLICATION

This application is a continuation of U.S. patent application Ser. No. 15/880,224, filed Jan. 25, 2018 (now U.S. Pat. No. 10,475,061), which is incorporated herein by reference.

BACKGROUND

A loyalty program is a marketing program designed to encourage customers to continue to transact with an organization associated with the loyalty program. Customers who participate in a loyalty program may be associated with a loyalty account, and may be offered an allotment of loyalty points, associated with the loyalty account, that the customers can apply to future transactions.

SUMMARY

According to some possible implementations, a transaction backend device may comprise one or more memories, and one or more processors, communicatively coupled to the one or more memories, configured to receive, from a transaction terminal, transaction information related to a transaction that an individual is completing. The transaction information may identify a location of the transaction, and the individual that is completing the transaction. The one or more processors may be configured to determine that an application installed on a user device associated with the individual was opened but that a virtual transaction card associated with the individual was not selected when completing the transaction. The one or more processors may be configured to determine, prior to completing the transaction and based on determining that the application was opened but that the virtual transaction card was not selected, that the individual did not use a benefit account in association with completing the transaction. The benefit account may be associated with at least one of: receiving rewards points in association with the transaction, receiving loyalty points in association with the transaction, or receiving a discount in association with the transaction. The one or more processors may be configured to perform an action to facilitate use of the benefit account in association with completing the transaction.

According to some possible implementations, a non-transitory computer-readable medium may store one or more instructions that, when executed by one or more processors, may cause the one or more processors to receive transaction information related to a transaction that an individual is completing. The transaction information may identify a location of the transaction, and the individual that is completing the transaction. The one or more instructions, when executed by the one or more processors, may cause the one or more processors to determine, prior to completing the transaction and based on data from a sensor of a transaction terminal or from a user device associated with the individual, that the individual did not use a benefit account associated with the location in association with completing the transaction. The benefit account may be a rewards account, a loyalty account, or a discount account. The one or more instructions, when executed by the one or more processors, may cause the one or more processors to perform an action to facilitate use of the benefit account in association with completing the transaction. The action may be performed prior to completing the transaction. The one or more instructions, when executed by the one or more processors, may cause the one or more processors to perform another action to complete the transaction after performing the action to facilitate use of the benefit account.

According to some possible implementations, a method may comprise receiving, by a transaction backend device, transaction information related to a transaction that an individual is completing. The method may comprise determining, by the transaction backend device, whether the individual is associated with a benefit account that can be used in association with completing the transaction. The benefit account may be associated with at least one of: rewards points, loyalty points, or a discount. The method may comprise determining, by the transaction backend device and based on data from a sensor of a transaction terminal or from a user device associated with the individual, that the individual did not use the benefit account in association with completing the transaction. The method may comprise performing, by the transaction backend device, an action to facilitate use of the benefit account in association with completing the transaction.

DETAILED DESCRIPTION

The following detailed description of example implementations refers to the accompanying drawings. The same reference numbers in different drawings may identify the same or similar elements.

A customer may have a benefit account for a loyalty or rewards program or may want to register an account to receive benefits, such as rewards points, coupons, discounts, cash back, and/or the like. Once the customer has submitted information to complete a transaction (e.g., bank account information), the customer cannot apply account information related to the loyalty or rewards program prior to the transaction being completed, causing the customer to lose benefits that would have otherwise been received. In addition, the customer would have to cancel the transaction and re-complete the transaction in order to receive the benefits, thereby wasting time, consuming processing and/or network resources of devices related to completing the transaction, and/or the like. If the customer did not have a benefit account, the customer would have to register for the benefit account after the transaction is complete and attempt to receive retroactive benefits for the transaction, thereby causing the customer to waste time. In addition, the customer could cancel the transaction, register for the benefit account, and re-complete the transaction. However, this is inefficient and consumes processing resources of devices related to completing the transaction.

Some implementations, described herein, provide a transaction backend device that is capable of interrupting completion of a transaction after a transaction has been submitted to the transaction backend device for completion. In this way, the transaction backend device can facilitate use of a benefit account when completing a transaction. This increases an efficiency of using a benefit account to complete a transaction by reducing or eliminating a need for a customer to cancel a transaction to apply a benefit account to the transaction, to re-complete a transaction, and/or the like. In addition, this conserves processing resources of devices related to a transaction, by reducing or eliminating a need for the devices to re-process data related to a transaction. Further, this saves time of a customer and/or increases an efficiency of completing a transaction by reducing or eliminating a need for the customer to re-complete a transaction, to contact a customer support representative of an organization to have a benefit account retroactively applied to a transaction, and/or the like.

Figure 1:
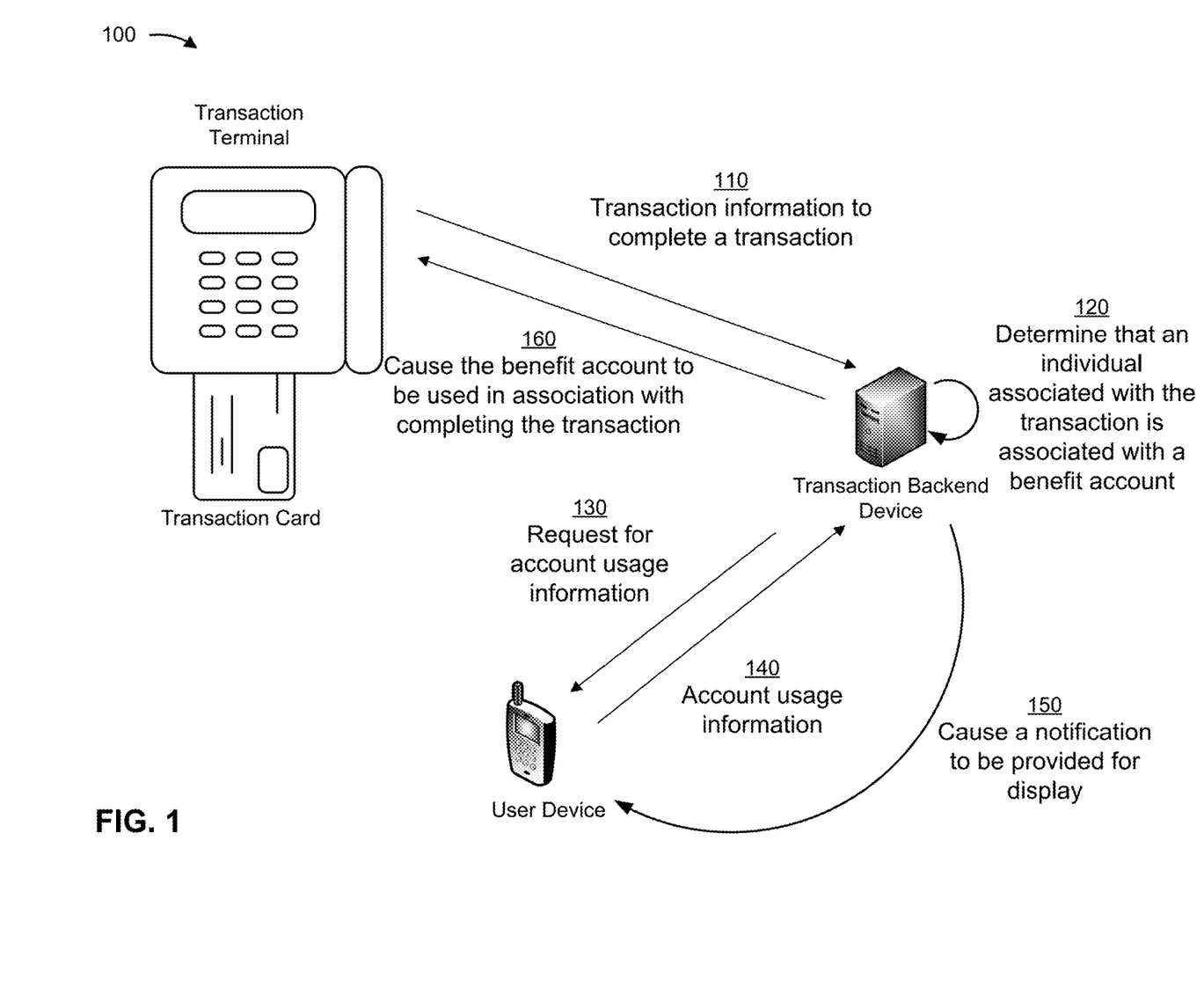
FIG. 1 is a diagram of an overview of an example implementation described herein.

FIG. 1 is a diagram of an overview of an example implementation 100 described herein. As shown in FIG. 1, implementation 100 includes a transaction card, a transaction terminal, a transaction backend device, and a user device. Assume for implementation 100 that the transaction card is communicatively coupled to the transaction terminal to complete a transaction, such as at a point-of-sale system in a store.

As shown in FIG. 1, and by reference number 110, the transaction terminal may provide, to the transaction backend device, transaction information to complete a transaction. For example, the transaction information may identify a bank, a bank account, an account balance of the bank account, a personal identification number (PIN) for the bank account, an individual associated with the transaction card, and/or the like associated with completing a transaction. Assume for FIG. 1 that the user of the transaction card did not input information for a benefit account, such as a benefit account associated with a loyalty program or a rewards program that receives rewards points, cash back, discounts, and/or the like in association with completing a transaction.

As shown by reference number 120, the transaction backend device may determine that an individual associated with the transaction is associated with a benefit account. For example, the transaction backend device may identify an individual associated with the transaction based on information included in the transaction information (e.g., information that identifies an owner of the transaction card) and may perform a lookup of the information identifying the individual in a data structure that includes information that identifies individuals that have a benefit account. Continuing with the previous example, the transaction backend device may determine that the individual is associated with a benefit account when a result of the lookup indicates a match.

The transaction backend device may perform this determination after receiving the transaction information and prior to completing the transaction. In this way, the transaction backend device may interrupt completion of a transaction to facilitate use of the benefit account. In addition, the transaction backend device may perform this determination after determining that the individual did not use the benefit account when completing the transaction. For example, the transaction backend device may determine that the individual did not use the benefit account based on account usage information included in the transaction information that identifies whether the benefit account was used when completing the transaction.

Additionally, or alternatively, and as shown by reference number 130, the transaction backend device may provide, to the user device, a request for account usage information. For example, the account usage information from the user device may identify whether a virtual transaction card associated with the benefit account, and stored on the user device, was used to complete the transaction, whether an application associated with an organization with which the benefit account is associated was opened within a threshold amount of time of the individual submitting the transaction for completion, and/or the like. In some cases, the account usage information from the user device and account usage information included in the transaction information can be used to confirm each other. This improves an accuracy of determining whether a benefit account was used when completing a transaction.

As shown by reference number 140, the user device may provide, to the transaction backend device, the account usage information. After receiving the account usage information, the transaction backend device may determine whether the benefit account was used in association with completing the transaction. Assume for FIG. 1 that the benefit account was not used in association with completing the transaction.

After determining that the individual did not use the benefit account in association with completing the transaction, the transaction backend device may perform various actions to facilitate use of the benefit account in association with completing the transaction. For example, and as shown by reference number 150, the transaction backend device may cause a notification to be provided for display via the user device. Continuing with the previous example, the notification may identify that the user has a benefit account and/or that the benefit account was not used in association with completing the transaction. Additionally, or alternatively, the notification may request input (e.g., selection of a user element on a user interface associated with the notification) to authorize use of the benefit account. The user device may provide, to the transaction backend device, information identifying that a user of the user device has authorized use of the benefit account in association with completing the transaction.

As another example, and as shown by reference number 160, the transaction backend device may cause the benefit account to be used in association with completing the transaction. For example, the transaction backend device may provide account information for the benefit account to the transaction terminal and may provide a set of instructions to cause the transaction terminal to apply the benefit account to the transaction. Additionally, or alternatively, the transaction backend device may cause a user interface to be provided for display via a display associated with the transaction terminal. For example, the user interface may include user interface elements for inputting account information for the benefit account. Additionally, or alternatively, the transaction backend device may activate a sensor of the transaction terminal to facilitate use of the benefit account when completing the transaction. For example, the transaction backend device may cause a reader of the transaction terminal to be activated so that an individual can use a transaction card associated with the benefit account (e.g., so that the individual can swipe a transaction card associated with the benefit account, scan a barcode of a transaction card associated with the benefit account, etc.). The transaction backend device may complete the transaction using the benefit account.

In this way, the transaction backend device may prevent further processing of a transaction to facilitate use of a benefit account in association with the transaction. This conserves processing resources of the transaction backend device and/or the transaction terminal that would otherwise be consumed re-processing a transaction so that a benefit account can be applied to the transaction and/or that would otherwise be consumed retroactively applying a benefit account to a transaction. In addition, this increases use of a benefit account, thereby increasing a value saved by an individual. Further, this improves an efficiency of using a benefit account in association with completing a transaction by facilitating automatic application of the benefit account to the transaction.

As indicated above, FIG. 1 is provided merely as an example. Other examples are possible and may differ from what was described with regard to FIG. 1.

Although FIG. 1 was described with regard to a transaction backend device, some implementations may be performed by the user device (e.g., an application installed on the user device). For example, an application on a user device may be linked to a bank account and/or a benefit account and the application may determine whether the bank account and the benefit account were used in association with completing a transaction. Continuing with the previous example, the application may determine that the bank account was used in association with completing a transaction, but that the benefit account was not used in association with completing the transaction. In this case, the application may send a message to a transaction terminal via which the transaction is being completed and/or to a transaction backend device to interrupt completion of the transaction.

Additionally, or alternatively, the application may determine whether virtual transaction cards, stored on the user device and associated with the bank account and the benefit account, were used in association with completing the transaction. In addition, the application may provide a message for display, via the user device, to indicate that the benefit account was not used in association with completing the transaction. In this way, completion of a transaction may be interrupted by an application so that a benefit account can be applied to the transaction.

Figure 2:
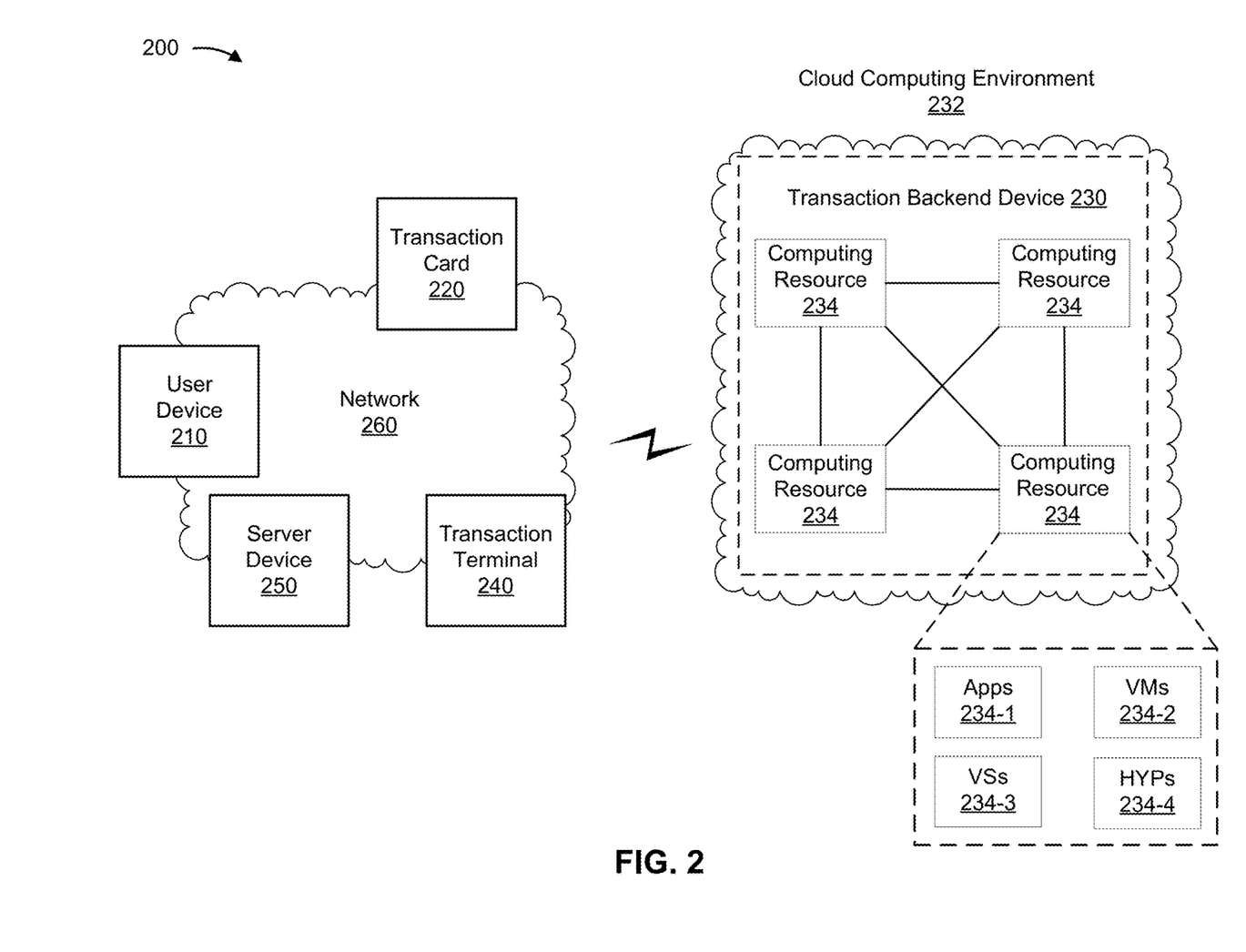
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction backend device 230 within a cloud computing environment 232 that includes a set of computing resources 234, a transaction terminal 240, a server device 250, and a network 260. Devices of environment 200 may interconnect via wired connections, wireless connections, or a combination of wired and wireless connections.

User device 210 includes one or more devices capable of receiving, generating, storing, processing, and/or providing information associated with use of an account when completing a transaction. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. In some implementations, user device 210 may receive, from transaction backend device 230, a request for account usage information for a benefit account, as described elsewhere herein. Additionally, or alternatively, user device 210 may provide, to transaction backend device 230, account usage information for a benefit account, as described elsewhere herein. In some implementations, user device 210 may include an electronic wallet or another type of transaction application to facilitate use of a transaction mechanism and/or a benefit account via the electronic wallet or the other type of application.

Transaction card 220 includes a transaction card that can be used to complete a transaction. For example, transaction card 220 may include a credit card, a debit card, a gift card, a payment card, an automated teller machine (ATM) card, a stored-value card, a fleet card, a transit card, an access card, a virtual card implemented on user device 210, and/or the like. Transaction card 220 may be capable of storing and/or communicating data for a point-of-sale (PoS) transaction with transaction terminal 240. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip). In some implementations, transaction card 220 may provide, to transaction terminal 240, information to be used to complete a transaction, as described elsewhere herein.

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may communicate with transaction terminal 240 to complete a transaction (e.g., based on being moved within communicative proximity of transaction terminal 240), as described elsewhere herein.

Transaction backend device 230 includes one or more devices capable of authorizing and/or facilitating a transaction. For example, transaction backend device 230 may include one or more servers and/or computers to store and/or provide information associated with processing a transaction via transaction terminal 240. In some implementations, transaction backend device 230 may process information from transaction card 220 to complete a transaction, as described elsewhere herein. Additionally, or alternatively, transaction backend device 230 may determine whether a benefit account was used in association with completing a transaction and may perform an action to facilitate use of the benefit account if the benefit account was not used, as described elsewhere herein.

Transaction backend device 230 may include one or more devices associated with a financial institution (e.g., a bank, a lender, a credit union, etc.) and/or a transaction card association that authorizes a transaction and/or facilitates a transfer of funds or payment between an account associated with a cardholder of transaction card 220 and an account of an individual or business associated with transaction terminal 240. For example, transaction backend device 230 may include one or more devices of one or more issuing banks associated with a cardholder of transaction card 220, one or more devices of one or more acquiring banks (or merchant banks) associated with transaction terminal 240, and/or one or more devices associated with one or more transaction card associations (e.g., VISA®, MASTERCARD®, and/or the like) associated with transaction card 220. Accordingly, based on receiving information associated with transaction card 220 from transaction terminal 240, devices of transaction backend device 230 (e.g., associated with a financial institution or transaction card association) may communicate to authorize a transaction and/or transfer funds between the accounts associated with transaction card 220 and/or transaction terminal 240.

Transaction backend device 230 may provide or deny authorization associated with a transaction. For example, transaction backend device 230 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with transaction card 220 and/or provided by transaction terminal 240.

Transaction backend device 230 may include one or more devices associated with a rewards program associated with transaction card 220 and/or an entity (e.g., a financial institution, a merchant, a service provider, a vendor, and/or the like) associated with transaction card 220 and/or transaction terminal 240. For example, transaction backend device 230 may authorize the earning and/or redemption of rewards (e.g., rewards points associated with transaction card 220, cash rewards, client loyalty rewards associated with an entity associated with transaction terminal 240, and/or the like) based on a transaction processed by transaction terminal 240.

In some implementations, as shown in FIG. 2, transaction backend device 230 may be hosted in cloud computing environment 232. Notably, while implementations described herein describe transaction backend device 230 as being hosted in cloud computing environment 232, in some implementations, transaction backend device 230 may not be cloud-based (i.e., may be implemented outside of a cloud computing environment) or may be partially cloud-based.

Cloud computing environment 232 includes an environment that hosts transaction backend device 230. Cloud computing environment 232 may provide computation, software, data access, storage, and/or other services that do not require end-user knowledge of a physical location and configuration of a system and/or a device that hosts transaction backend device 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host transaction backend device 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with transaction backend device 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Transaction terminal 240 includes one or more devices capable of facilitating processing of a transaction associated with transaction card 220. For example, transaction terminal 240 may include a point-of-sale (PoS) terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 240 may communicate with transaction backend device 230 to provide, to transaction backend device 230, information related to a transaction for which transaction card 220 is being used, as described elsewhere herein. In some implementations, transaction terminal 240 may process information related to a benefit account to apply the benefit account to a transaction, as described elsewhere herein. Additionally, or alternatively, transaction terminal 240 may activate a sensor and/or provide a user interface for display to facilitate use of a benefit account in association with completing a transaction, as described elsewhere herein.

In some implementations, transaction terminal 240 may include one or more input components and/or output components to facilitate obtaining information from transaction card 220 (e.g., an account number of an account associated with transaction card 220, an expiration date of transaction card 220, etc.), input (e.g., a personal identification number (PIN), a signature, biometric information, etc.), from a cardholder of transaction card 220, related to completing and/or authorizing a transaction, and/or the like. In some implementations, example input components of transaction terminal 240 may include a number keypad, a touchscreen, a magnetic strip reader, a chip reader, a pen and corresponding signature pad, an RF signal reader, and/or the like.

In some implementations, a magnetic strip reader of transaction terminal 240 may receive data from transaction card 220 as a magnetic strip of transaction card 220 is swiped along the magnetic strip reader. In some implementations, a chip reader of transaction terminal 240 may receive data from transaction card 220 via an integrated circuit chip (e.g., an EMV chip) of transaction card 220 when the chip is placed within communicative proximity of the chip reader. In some implementations, an RF signal reader of transaction terminal 240 may enable a contactless transaction from transaction card 220 and/or user device 210 by obtaining data wirelessly from transaction card 220 and/or user device 210 as transaction card 220 and/or user device 210 comes within communicative proximity of transaction terminal 240, such that the RF signal reader detects an RF signal from an RF antenna of transaction card 220 and/or user device 210.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

Server device 250 includes one or more devices capable of receiving, generating, storing, processing, and/or providing information associated with a benefit account that can be used in association with completing a transaction. For example, server device 250 may include a server (e.g., in a data center or a cloud computing environment), a data center (e.g., in a multi-server micro data center), a workstation computer, a virtual machine (VM) provided in a cloud computing environment, or a similar type of device. In some implementations, server device 250 may store information related to a benefit account that can be used in association with completing a transaction, as described elsewhere herein. Additionally, or alternatively, server device 250 may provide information related to a benefit account to transaction backend device 230 to facilitate use of the benefit account in association with completing a transaction, as described elsewhere herein.

Network 260 includes one or more wired and/or wireless networks. For example, network 260 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
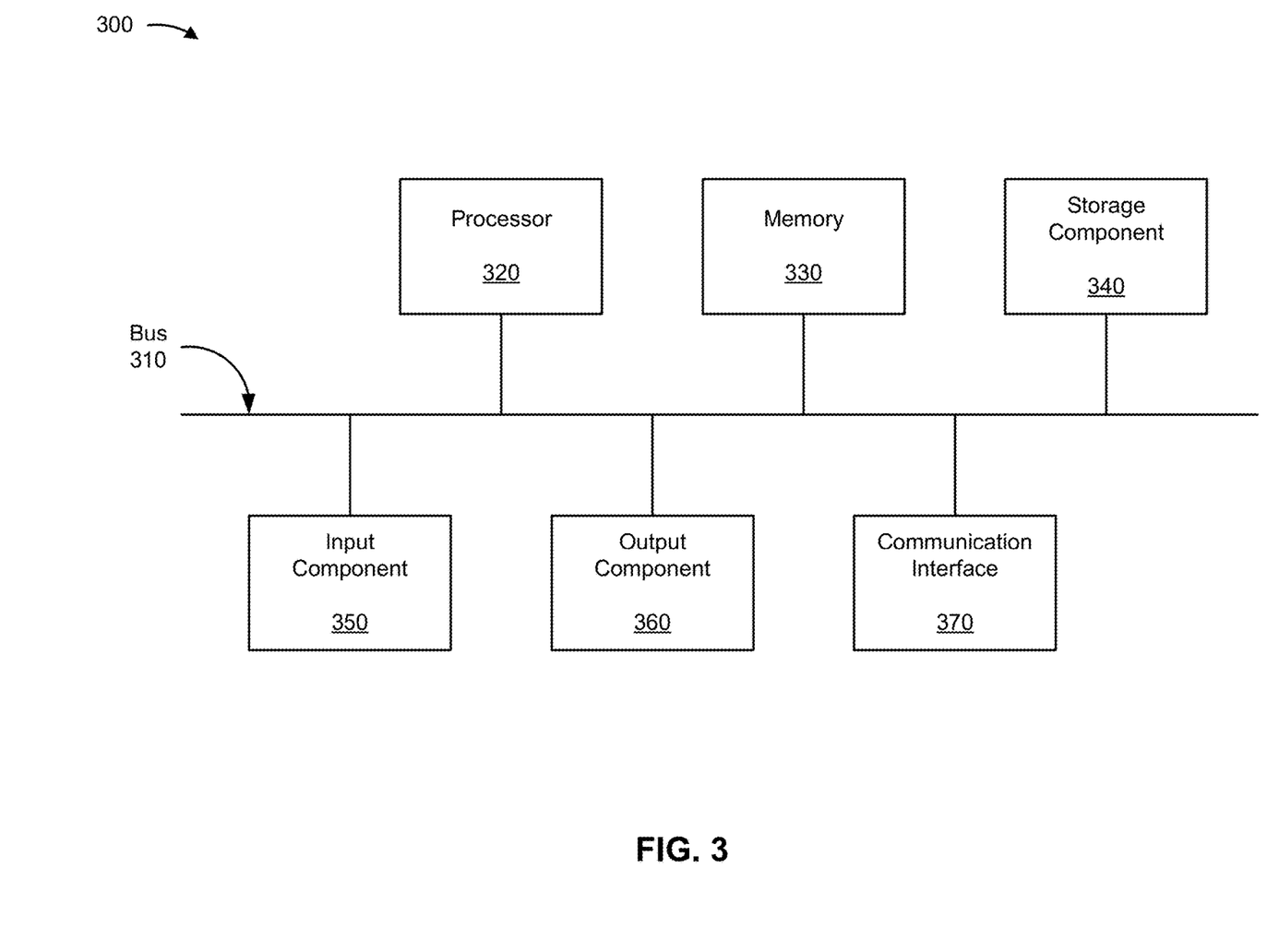
FIG. 3 is a diagram of example components of one or more devices of FIG. 2.

FIG. 3 is a diagram of example components of a device 300. Device 300 may correspond to user device 210, transaction card 220, transaction backend device 230, computing resource 234, transaction terminal 240, and/or server device 250. In some implementations, user device 210, transaction card 220, transaction backend device 230, computing resource 234, transaction terminal 240, and/or server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
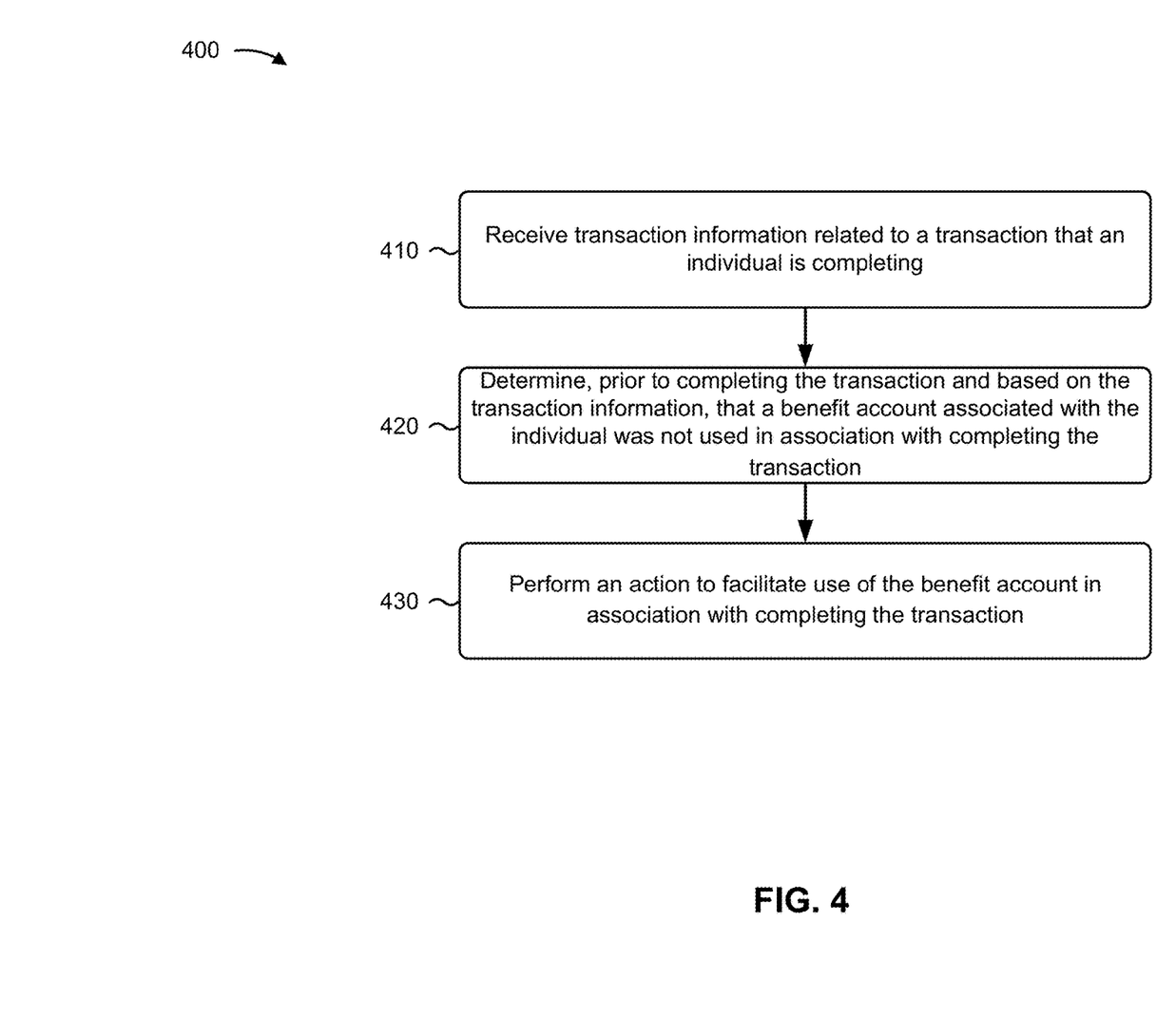
FIG. 4 is a flow chart of an example process for intra-transaction account generation.

FIG. 4 is a flow chart of an example process 400 for intra-transaction account generation. In some implementations, one or more process blocks of FIG. 4 may be performed by transaction backend device 230. In some implementations, one or more process blocks of FIG. 4 may be performed by another device or a group of devices separate from or including transaction backend device 230, such as user device 210, transaction card 220, computing resource 234, transaction terminal 240, and server device 250.

As shown in FIG. 4, process 400 may include receiving transaction information related to a transaction that an individual is completing (block 410). For example, transaction backend device 230 may receive information related to a transaction that an individual is completing (e.g., via transaction terminal 240). In some implementations, transaction backend device 230 may receive millions, billions, or more data elements when receiving transaction information, thereby receiving a data set that cannot be processed manually or objectively (e.g., in a consistent manner) by a human actor.

In some implementations, transaction information may include information related to a transaction being completed via transaction terminal 240 using transaction card 220 or a payment mechanism via user device 210. For example, transaction information may identify a location of a transaction, parties (e.g., individuals, organizations, etc.) with which the transaction is associated, account information for a financial account used to complete the transaction, a value of the transaction, a party with which transaction terminal 240 is associated, a party with which transaction card 220 is associated, and/or the like.

In some implementations, transaction backend device 230 may receive transaction information from transaction terminal 240. For example, transaction backend device 230 may receive the transaction information when a user of transaction terminal 240 submits a transaction to transaction backend device 230 for completion (e.g., by selecting a user interface element of a user interface or an input component associated with transaction terminal 240 that causes transaction terminal 240 to submit the transaction information to transaction backend device 230).

Additionally, or alternatively, transaction backend device 230 may receive transaction information from an electronic wallet associated with an individual completing the transaction. For example, the electronic wallet may be hosted on user device 210 associated with the individual and may send a message to transaction backend device 230 to notify transaction backend device 230 that a virtual transaction card 220 stored in the electronic wallet was used in association with completing the transaction. In some implementations, transaction backend device 230 may receive the transaction information in real-time or near real-time (e.g., as the transaction is occurring, prior to the transaction being completed, as the transaction is being completed, etc.).

In some implementations, user device 210 may determine transaction information. For example, an application installed on user device 210 may be associated with a bank account and/or a benefit account and can be used to complete a transaction (e.g., in a mobile payment context). In this case, the application may determine transaction information based on user device 210 communicating with transaction terminal 240 to complete a transaction.

In some implementations, transaction information may not be related to an initiated transaction. For example, transaction information may be related to and/or may indicate a desire to initiate and/or complete a transaction by a user of user device 210. For example, user device 210 may determine that an electronic wallet installed on user device 210 and/or a virtual transaction card associated with the electronic wallet has been selected but that a benefit account associated with the electronic wallet has not been selected.

Additionally, or alternatively, user device 210 may detect that user device 210 is at a location (e.g., a retail location), such as by communicating with a wireless beacon device at the location, based on a set of coordinates, etc., and may prompt a user of user device 210 to use a benefit account associated with the location (e.g., prior to configuring user device 210 to complete a transaction via transaction terminal 240). Continuing, user device 210 may provide information related to a benefit account to transaction terminal 240 prior to completing a transaction via transaction terminal 240 and/or prior to transaction terminal 240 providing transaction information to transaction backend device 230. This facilitates application of a benefit account to a transaction prior to completion of a transaction, thereby reducing or eliminating a need for cancellation of a transaction to permit application of a benefit account to the transaction.

In this way, transaction backend device 230 may receive transaction information prior to determining that a benefit account associated with an individual was not used in association with completing a transaction.

As further shown in FIG. 4, process 400 may include determining, prior to completing the transaction and based on the transaction information, that a benefit account associated with the individual was not used in association with completing the transaction (block 420). For example, transaction backend device 230 may determine, prior to completing the transaction and based on the transaction information, that a benefit account associated with the individual was not used in association with completing the transaction.

In some implementations, a benefit account may be associated with a loyalty program, a rewards program, a discount program, a cash back program, and/or the like. For example, the benefit account may be associated with receiving loyalty points (e.g., a loyalty account), rewards points (e.g., a rewards account), a discount (e.g., a discount account), cash back (e.g., a cash back account), and/or the like in association with using the benefit account to complete a transaction.

In some implementations, transaction backend device 230 may process information stored in a data structure to determine whether an individual is associated with a benefit account (e.g., using information included in transaction information that identifies the individual, such as a cardholder of transaction card 220 used to complete the transaction). For example, the data structure may include information that identifies individuals that have benefit accounts.

Continuing with the previous example, the data structure may be generated when a user of user device 210 registers for a benefit account, when an individual adds a benefit account to an electronic wallet hosted on user device 210, when a device processes messages in a messaging account to identify that a user of user device 210 is associated with a benefit account (e.g., and auto-populates an electronic wallet with information related to the benefit account and/or notifies transaction backend device 230 of the benefit account), and/or the like. Continuing still with the previous example, different data structures may be associated with different locations (e.g., different retailers, different geographic locations, etc.), different types of transactions (e.g., a retail transaction, a travel transaction, a grocery transaction, etc.), and/or the like. In some implementations, transaction backend device 230 may select a data structure to process based on information included in transaction information that identifies a location of the transaction, a retailer associated with the transaction, a type of the transaction, and/or the like.

Additionally, or alternatively, a data structure may be associated with an individual and may include information that identifies various benefit accounts associated with the individual. In this case, transaction backend device 230 may identify a data structure associated with an individual completing a transaction and may process the data structure to determine if the individual is associated with a benefit account for the location of the transaction, the type of the transaction, and/or the like. This conserves processing resources of transaction backend device 230 by reducing an amount of information and/or a quantity of data structures that transaction backend device 230 has to process.

In some implementations, transaction backend device 230 may process information in a data structure by performing a lookup of information identifying an individual associated with the transaction in the data structure. In some implementations, transaction backend device 230 may determine whether an individual is associated with a benefit account based on a result of the lookup indicating a match.

In some implementations, transaction backend device 230 may determine that an individual is associated with a benefit account after processing a data structure (e.g., when a result of the lookup indicates a match). In this case, transaction backend device 230 may determine whether the individual used the benefit account in association with completing the transaction, as described in more detail below. In some implementations, transaction backend device 230 may determine that the individual is not associated with the benefit account (e.g., has not registered for the benefit account) based on processing information in a data structure. For example, transaction backend device 230 may determine that the individual has not registered for the benefit account when a result of the lookup fails to indicate a match.

In some implementations, if transaction backend device 230 determines that an individual has not registered for a benefit account, transaction backend device 230 may perform an action to facilitate registration of the individual for the benefit account. For example, transaction backend device 230 may provide a set of instructions to user device 210 and/or transaction terminal 240 to cause a user interface associated with registering for the benefit account to be provided for display. Additionally, or alternatively, and as another example, transaction backend device 230 may request, via a user interface and from a user of user device 210, permission to register the user of user device 210 for the benefit account using information included in the transaction information.

In some implementations, user device 210 may determine that a user of user device 210 has not used a benefit account. For example, information related to the benefit account may be stored in an electronic wallet hosted on user device 210 and user device 210 may determine whether the information was provided to transaction terminal 240 and/or transaction backend device 230 in association with information for a virtual transaction card at a particular location associated with the benefit account, for a particular type of transaction (e.g., based on transaction information), and/or the like. In some implementations, user device 210 may trigger an alert to notify a user of user device 210 that a transaction is going to be completed with use of a benefit account, to notify the user that an electronic wallet is associated with a benefit account that can be used with the transaction (e.g., based on transaction information from transaction terminal 240 and/or transaction backend device 230, based on a location of user device 210, etc.), and/or the like. Additionally, or alternatively, user device 210 may prompt the user of user device 210 to indicate whether the user used a benefit account, such as when a benefit account is applied to a transaction via use of a key ring fob, a telephone number input into transaction terminal 240, and/or the like. In this way, user device 210 may determine whether a benefit account has been used, thereby conserving processing resources of transaction terminal 240 and/or transaction backend device 230.

Additionally, or alternatively, and as another example, transaction backend device 230 may provide a set of instructions to transaction terminal 240 to cause an output component of transaction terminal 240 to output information to notify another individual that the individual using transaction terminal 240 needs to be registered for the benefit account. Continuing with the previous example, the set of instructions may activate a light on transaction terminal 240 at a checkout lane in a store to notify a cashier or other employee of the store that the individual needs to be registered for the benefit account.

In some implementations, transaction backend device 230 may receive, from user device 210 associated with the individual, account usage information that identifies whether the individual used the benefit account in association with completing the transaction. For example, transaction backend device 230 may receive account usage information from user device 210 when user device 210 (e.g., a virtual transaction card 220 stored on user device 210) is used to complete a transaction. Additionally, or alternatively, and as another example, transaction backend device 230 may receive account usage information from user device 210 based on transaction backend device 230 requesting the account usage information from user device 210. In some implementations, transaction backend device 230 may determine that the individual did not use the benefit account in association with completing the transaction based on account usage information indicating that the benefit account was not used.

In some implementations, account usage information may include information related to use of a benefit account in association with completing a transaction. For example, account usage information may indicate whether a virtual transaction card 220 associated with a benefit account was used in association with completing a transaction, whether a particular application was opened on user device 210 within a threshold amount of time prior to a transaction being submitted for completion (e.g., as determined by comparing a timestamp related to the transaction and a timestamp related to opening of the particular application), and/or the like. In some implementations, transaction information may include account usage information. For example, transaction information from transaction terminal 240 may include account usage information that indicates whether account information for a benefit account was input to transaction terminal 240 in association with completing the transaction (e.g., via an input component of transaction terminal 240, via a sensor of transaction terminal 240, etc.).

In some implementations, transaction backend device 230 may determine whether an application installed on user device 210 associated with the individual was opened in association with the individual completing the transaction (e.g., based on account usage information). For example, account usage information received from user device 210 may indicate timestamps for when an application associated with a benefit account was open. Continuing with the previous example, transaction backend device 230 may determine whether a timestamp for when an application was open is within a threshold amount of time of a timestamp associated with the transaction being submitted to transaction backend device 230 (e.g., indicating that the individual may have opened the application and used account information, accessible via the application, for a benefit account in association with completing the transaction).

Additionally, or alternatively, transaction backend device 230 may determine whether a virtual transaction card 220, associated with the individual and for the benefit account, was selected in association with the individual completing the transaction (e.g., based on account usage information). For example, account usage information from user device 210 and/or transaction terminal 240 may indicate whether a virtual transaction card 220, associated with the benefit account, was used when completing the transaction, was used within a threshold amount of time of the transaction being submitted for completion (e.g., based on timestamps associated with use of the virtual transaction card 220 and the transaction being submitted for completion), and/or the like.

In some implementations, transaction backend device 230 may determine whether the benefit account was used based on information from a sensor of transaction terminal 240 (e.g., information indicating whether the sensor was used in association with completing the transaction, whether account information for the benefit account was input via the sensor, etc.). For example, the sensor may be a reader, such as an radio-frequency identification (RFID) reader, a bar-code reader, a wireless payment reader, and/or the like and may be used by an individual to apply a benefit account to a transaction (e.g., by moving a particular transaction card 220 associated with the benefit account within communicative proximity of the sensor, by moving user device 210 within communicative proximity of the sensor while a virtual transaction card 220 is selected, etc.). In this case, transaction backend device 230 may receive information from the sensor based on requesting the information, when transaction terminal 240 provides transaction information to transaction backend device 230, and/or the like.

As a specific example, transaction backend device 230 may determine that an application installed on user device 210 was not opened or that a virtual transaction card 220 was not selected based on data from a sensor. Continuing with the previous example, the application may display, via a user interface, a bar code, a Quick Response (QR) code, a randomly generated dynamic PIN, and/or the like that can be input or read by the sensor. Information from the sensor may indicate whether the bar code was scanned by the sensor, whether the QR code was scanned by the sensor, whether the PIN was input into the sensor, and/or the like. Similarly, for a virtual transaction card 220, if the virtual transaction card 220 is selected on user device 210, information related to the benefit account may be provided to the sensor when user device 210 is within communicative proximity of the sensor.

In this way, transaction backend device 230 may determine that a benefit account associated with an individual was not used in association with completing a transaction prior to performing an action to facilitate use of the benefit account.

In some implementations, user device 210, rather than transaction backend device 230, may determine that a benefit account associated with the individual was not used in association with completing the transaction. For example, an application installed on user device 210 may be linked to a bank account and/or a benefit account. In this case, the application may detect that the bank account was used in association with completing a transaction but that the benefit account was not used in association with completing the transaction. For example, the application may determine that a virtual transaction card 220 for the bank account was used in association with completing the transaction but that another virtual transaction card 220 associated with the benefit account was not used. Additionally, or alternatively, the application may determine whether particular user interfaces associated with the application were accessed by a user of user device 210 (e.g., a user interface associated with a benefit account), whether particular features of the application were used (e.g., features associated with a benefit account), and/or the like that can indicate that the user accessed and/or used a benefit account in association with completing a transaction.

Additionally, or alternatively, and as another example, user device 210 may determine that a mobile banking application for the bank account was opened in association with completing the transaction but that a mobile rewards application was not opened in association with completing the transaction (e.g., based on a timestamps for when the mobile banking application and the rewards application were opened). In this way, user device 210 may determine that the benefit account was not used in association with completing a transaction.

As further shown in FIG. 4, process 400 may include performing an action to facilitate use of the benefit account in association with completing the transaction (block 430). For example, transaction backend device 230 may perform an action to facilitate use of the benefit account in association with completing the transaction. In some implementations, the action may be performed prior to completing the transaction.

In some implementations, transaction backend device 230 may provide a notification for display via user device 210 associated with the individual. For example, the notification may identify that the benefit account is available for use in association with completing the transaction. Additionally, or alternatively, the notification may identify that the individual did not use the benefit account in association with completing the transaction.

In some implementations, transaction backend device 230 may receive, via an application installed on user device 210 associated with the individual, an indication that the individual has approved use of the benefit account in association with completing the transaction and/or that the individual wants to use the benefit account in association with completing the transaction. For example, when transaction backend device 230 determines that the benefit account was not used in association with completing the transaction, transaction backend device 230 may provide a set of instruction to user device 210 associated with the individual to cause an application to open on user device 210. In some implementations, the application may have a user interface with one or more user interface elements (e.g., buttons, controls, menus, text boxes, etc.) that the individual can select to approve use of the benefit account in association with completing the transaction. In some implementations, after receiving approval to use the benefit account, transaction backend device 230 may provide to transaction terminal 240 account information related to the benefit account to facilitate use of the benefit account in association with completing the transaction.

Additionally, or alternatively, transaction backend device 230 may apply the benefit account to the transaction rather than providing account information to transaction terminal 240. This conserves processing resources of transaction backend device 230 and/or transaction terminal 240. In addition, this conserves network resources of network 260 between transaction backend device 230 and transaction terminal 240.

In some implementations, transaction backend device 230 may select a virtual transaction card 220 in an electronic wallet associated with the individual. For example, the virtual transaction card 220 may be associated with the benefit account. In some implementations, transaction backend device 230 may select a virtual transaction card 220 using a data structure that includes information identifying virtual transaction cards 220 associated with the individual and the contexts in which the virtual transaction cards 220 can be used. For example, the information in the data structure may identify a virtual transaction card 220 associated with the benefit account, a location of the transaction, a type of the transaction, and/or the like. In some implementations, after selecting the virtual transaction card 220, transaction backend device 230 may provide information related to the virtual transaction card 220 to transaction terminal 240 to facilitate use of the benefit account, may provide a set of instructions to user device 210 to cause a user interface associated with the virtual transaction card 220 to be provided for display, and/or the like. For example, the information may include an identifier for the virtual transaction card 220, a security code for the virtual transaction card 220, a benefit account identifier for the benefit account, and/or the like.

In some implementations, transaction backend device 230 may communicate with server device 250 to register the benefit account for the individual after determining that the individual did not use the benefit account in association with completing the transaction and that the individual is not associated with the benefit account. For example, transaction backend device 230 may use personal information (e.g., a name, an address, a phone number, etc.) included in the transaction information and/or input by the individual via a user interface displayed on user device 210 to register the individual for the benefit account. Continuing with the previous example, transaction backend device 230 may provide the personal information to server device 250 to register the individual for the benefit account and may provide, for display via user device 210, information related to the benefit account to facilitate use of the benefit account in association with completing the transaction.

In some implementations, transaction backend device 230 may interrupt, delay, or postpone processing of a transaction until further action by a user (e.g., via user device 210) or merchant with respect to determining whether to apply a benefit account in association with completing the transaction. In some implementations, transaction backend device 230 may cause transaction terminal 240 to activate a user interface associated with transaction terminal 240. For example, the user interface may include one or more user interface elements related to inputting account information associated with the benefit account or indicating authorization to use benefit account information to complete the transaction. Additionally, or alternatively, transaction backend device 230 may cause transaction terminal 240 to activate a sensor associated with transaction terminal 240. For example, the sensor may be configured to receive account information for the benefit account from user device 210, from transaction card 220, and/or the like.

In some implementations, transaction backend device 230 may complete the transaction. For example, transaction backend device 230 may complete the transaction after receiving an indication from transaction terminal 240 that the benefit account was applied to the transaction, after receiving updated transaction information from transaction terminal 240, after performing an action to facilitate use of the benefit account in association with completing the transaction, and/or the like.

In some implementations, user device 210 may perform an action. For example, an application on user device 210 may send a message to transaction terminal 240 and/or transaction backend device 230 to interrupt completion of a transaction so that the benefit account can be applied to the transaction. Additionally, or alternatively, and as additional examples, the application may open an application associated with the benefit account, may select a virtual transaction card 220, associated with the benefit account, from an electronic wallet, may provide a notification for display indicating that the benefit account was not used and/or that the benefit account is available for use, and/or the like. Additionally, or alternatively, the application may prompt a user of user device 210 to register for the benefit account, such as by providing a user interface for display associated with registering for the benefit account, opening and navigating a web-browser to a web page associated with registering for the benefit account, and/or the like.

Additionally, or alternatively, the application may request input, from a user of user device 210, as to whether the user would like to use the benefit account in association with completing the transaction. In some implementations, if the user indicates that the user wants to proceed without using the benefit account, the application may send a message to transaction terminal 240 and/or transaction backend device 230 to cause transaction terminal 240 and/or transaction backend device 230 to complete the transaction without using the benefit account.

In this way, transaction backend device 230 may perform an action to facilitate use of the benefit account in association with completing the transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
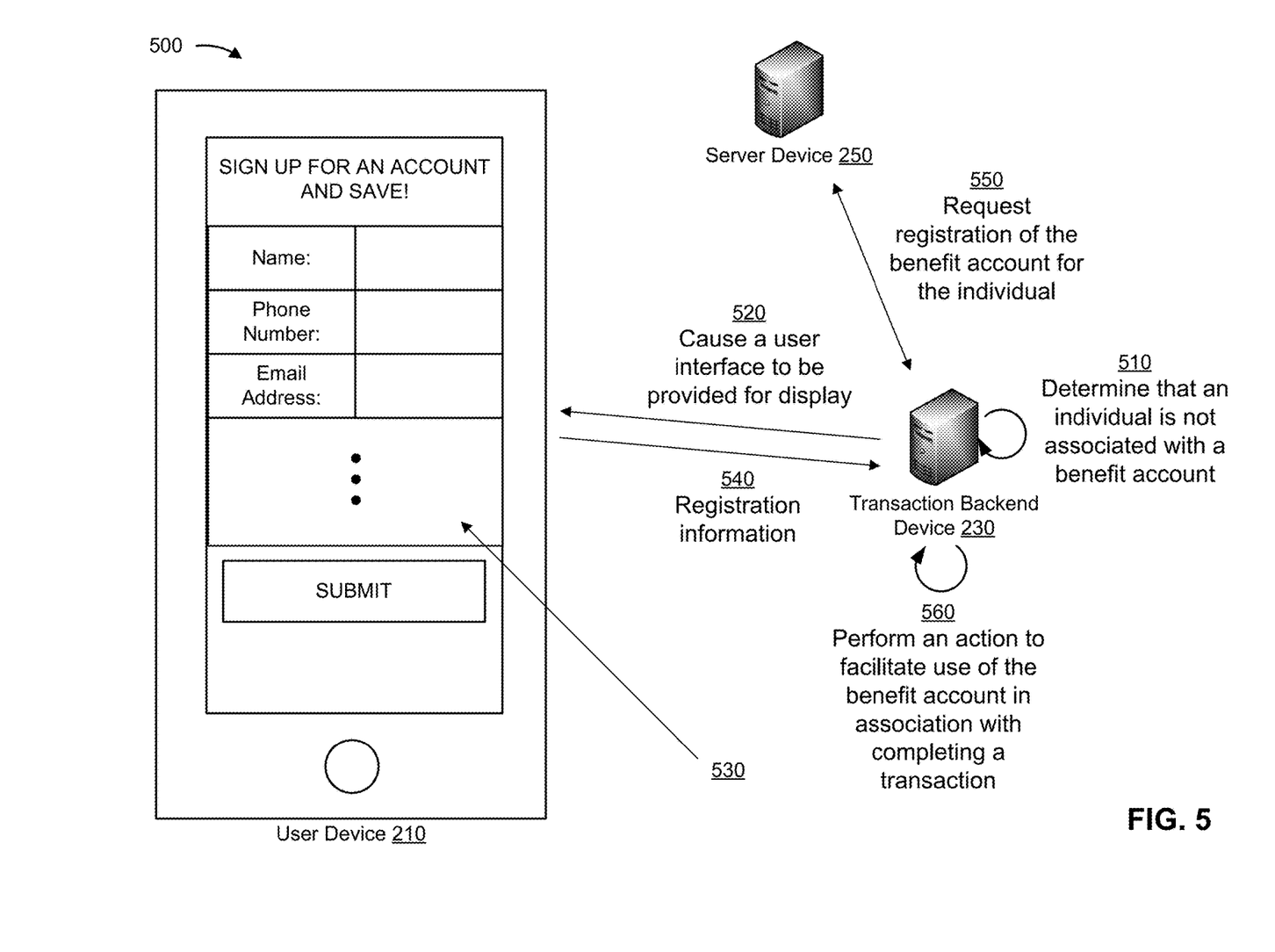
FIG. 5 is a diagram of an example implementation relating to the example process shown in FIG. 4.

FIG. 5 is a diagram of an example implementation 500 relating to the example process 400 shown in FIG. 4. FIG. 5 shows an example of transaction backend device 230 registering an individual to use a benefit account.

As shown in FIG. 5, and by reference number 510, transaction backend device 230 may determine that an individual is not associated with a benefit account. For example, transaction backend device 230 may determine that the individual is not associated with a benefit account using transaction information from transaction terminal 240, using a data structure that includes information identifying individuals and benefit accounts with which the individuals are associated, and/or the like.

As shown by reference number 520, transaction backend device 230 may cause a user interface to be provided for display via user device 210. For example, the user interface may include a set of user interface elements that can be used to input information related to registering the individual for the benefit account. As shown by reference number 530, and for example, the user interface may include text boxes for the individual to input a name to be associated with the benefit account, a phone number to be associated with the benefit account, an email address to be associated with the benefit account, and/or the like (e.g., registration information). In addition, and as further shown by reference number 530, the user interface may include a "SUBMIT" button, selection of which may cause user device 210 to provide information input into the user interface to transaction backend device 230. In some implementations, selection of the "SUBMIT" button may cause user device 210 to provide the information to server device 250 to register the individual for the benefit account.

As shown by reference number 540, user device 210 may provide, to transaction backend device 230, registration information input into the user interface displayed on user device 210. As shown by reference number 550, transaction backend device 230 may communicate with server device 250 to request registration of the benefit account for the individual. For example, transaction backend device 230 may provide, to server device 250, registration information for the individual. Additionally, or alternatively, transaction backend device 230 may provide a set of credentials (e.g., a PIN, a username/password, a security token, etc.) associated with the individual that was received from user device 210 to confirm, to server device 250, authorization for transaction backend device 230 to register the benefit account for the individual. In some implementations, server device 250 may communicate with user device 210 to confirm the authenticity of the set of credentials provided by transaction backend device 230 prior to registering the benefit account for the individual. This improves a security of personal information related to the individual.

As shown by reference number 560, transaction backend device 230 may perform an action to facilitate use of the benefit account in association with completing a transaction. For example, transaction backend device 230 may provide account information for the benefit account to transaction terminal 240, for display via user device 210, and/or the like.

As indicated above, FIG. 5 is provided merely as an example. Other examples are possible and may differ from what was described with regard to FIG. 5.

In this way, transaction backend device 230 may facilitate intra-transaction use and/or generation of a benefit account. This conserves processing resources related to applying the benefit account to a transaction after the transaction has been submitted for completion to transaction backend device 230. In addition, this improves an efficiency of applying the benefit account to a transaction by interrupting the transaction to facilitate application of the benefit account to the transaction. Further, this saves an individual time, by reducing or eliminating a need for the individual to have the benefit account retroactively applied to a transaction, and/or money through increased use of the benefit account.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, transaction information related to a transaction that is being completed at a transaction terminal;
   determining, by the device and based on data from a sensor of the transaction terminal or from a user device, that a benefit account was not used in association with completing the transaction;
   interrupting, by the device and based on determining that the benefit account was not used in association with completing the transaction, completion of the transaction;
   activating, by the device and based on interrupting completion of the transaction, the sensor,
      the sensor being configured to receive information associated with the benefit account from the user device or a transaction card; and
   completing, by the device and after interrupting completion of the transaction, the transaction based on receiving an indication from the transaction terminal that the benefit account was applied.

2. The method of claim 1, further comprising:
   activating, based on interrupting completion of the transaction, a user interface associated with the transaction terminal,
      the user interface including one or more user interface elements for at least one of:
         inputting the information associated with the benefit account, or
         indicating an authorization to use the benefit account to complete the transaction; and
   wherein completing the transaction comprises:
      completing the transaction based on at least one of:
         the information, associated with the benefit account, being input, or
         the authorization to use the benefit account to complete the transaction being indicated.

3. The method of claim 1, further comprising:
   determining that an individual associated with the transaction is not associated with the benefit account; and
   communicating, based on determining that the individual is not associated with the benefit account, with a server device to register the benefit account with the individual.

4. The method of claim 1, further comprising:
   providing, based on determining that the benefit account was not used in association with completing the transaction, one or more instructions to the user device to cause an application to open on the user device,
      the application including a user interface for receiving approval to use the benefit account in association with completing the transaction.

5. The method of claim 1, further comprising:
   determining that an individual associated with the transaction is not registered for the benefit account; and
   providing one or more instructions to the user device to cause a user interface, associated with registering for the benefit account, to be provided for display.

6. The method of claim 1, further comprising:
   determining that an individual associated with the transaction is not registered for the benefit account; and
   providing one or more instructions to the transaction terminal to cause a user interface, associated with registering for the benefit account, to be provided for display.

7. The method of claim 1, wherein determining that the benefit account was not used in association with completing the transaction comprises:
   determining that a virtual transaction card, associated with the benefit account, was not selected in association with the transaction.

8. A device, comprising:
   one or more memories; and
   one or more processors communicatively coupled to the one or more memories, configured to:
      receive transaction information related to a transaction that is being completed at a transaction terminal;
      determine, based on data from a sensor of the transaction terminal or from a user device, that a benefit account was not used in association with completing the transaction;
      interrupt, based on determining that the benefit account was not used in association with completing the transaction, completion of the transaction;
      activate, based on interrupting completion of the transaction, the sensor,
         the sensor being configured to receive information associated with the benefit account from the user device or a transaction card; and
      complete, after interrupting completion of the transaction, the transaction based on receiving an indication from the transaction terminal that the benefit account was applied.

9. The device of claim 8, wherein the one or more processors are further configured to:
   activate, based on interrupting completion of the transaction, a user interface associated with the transaction terminal,
      the user interface including one or more user interface elements for at least one of:
         inputting the information associated with the benefit account, or
         indicating an authorization to use the benefit account to complete the transaction; and
   wherein the one or more processors, when completing the transaction, are configured to:
      complete the transaction based on at least one of:
         the information, associated with the benefit account, being input, or
         the authorization to use the benefit account to complete the transaction being indicated.

10. The device of claim 8, wherein the one or more processors are further configured to:
- determine that an individual associated with the transaction is not associated with the benefit account; and
- communicate, based on determining that the individual is not associated with the benefit account, with a server device to register the benefit account with the individual.

11. The device of claim 8, wherein the one or more processors are further configured to:
- provide, based on determining that the benefit account was not used in association with completing the transaction, one or more instructions to the user device to cause an application to open on the user device,
  - the application including a user interface for receiving approval to use the benefit account in association with completing the transaction.

12. The device of claim 8, wherein the one or more processors are further configured to:
- determine that an individual associated with the transaction is not registered for the benefit account; and
- provide one or more instructions to the user device to cause a user interface, associated with registering for the benefit account, to be provided for display.

13. The device of claim 8, wherein the one or more processors are further configured to:
- determine that an individual associated with the transaction is not registered for the benefit account; and
- provide one or more instructions to the transaction terminal to cause a user interface, associated with registering for the benefit account, to be provided for display.

14. The device of claim 8, wherein the one or more processors, when determining that the benefit account was not used in association with completing the transaction, are configured to:
- determine that a virtual transaction card, associated with the benefit account, was not selected in association with the transaction.

15. A non-transitory computer-readable medium storing instructions, the instructions comprising:
- one or more instructions that, when executed by one or more processors, cause the one or more processors to:
  - receive transaction information related to a transaction that is being completed at a transaction terminal;
  - determine, based on data from a sensor of the transaction terminal or from a user device, that a benefit account was not used in association with completing the transaction;
  - interrupt, based on determining that the benefit account was not used in association with completing the transaction, completion of the transaction;
  - activate, based on interrupting completion of the transaction, the sensor,
    - the sensor being configured to receive information associated with the benefit account from the user device or a transaction card; and
  - complete, after interrupting completion of the transaction, the transaction based on receiving an indication from the transaction terminal that the benefit account was applied.

16. The non-transitory computer-readable medium of claim 15, wherein the one or more instructions, when executed by the one or more processors, further cause the one or more processors to:
- activate, based on interrupting completion of the transaction, a user interface associated with the transaction terminal,
  - the user interface including one or more user interface elements for at least one of:
    - inputting the information associated with the benefit account, or
    - indicating an authorization to use the benefit account to complete the transaction; and
- wherein the one or more instructions, that cause the one or more processors to complete the transaction, cause the one or more processors to:
  - complete the transaction based on at least one of:
    - the information, associated with the benefit account, being input, or
    - the authorization to use the benefit account to complete the transaction being indicated.

17. The non-transitory computer-readable medium of claim 15, wherein the one or more instructions, when executed by the one or more processors, further cause the one or more processors to:
- determine that an individual associated with the transaction is not associated with the benefit account; and
- communicate, based on determining that the individual is not associated with the benefit account, with a server device to register the benefit account with the individual.

18. The non-transitory computer-readable medium of claim 15, wherein the one or more instructions, when executed by the one or more processors, further cause the one or more processors to:
- provide, based on determining that the benefit account was not used in association with completing the transaction, one or more instructions to the user device to cause an application to open on the user device,
  - the application including a user interface for receiving approval to use the benefit account in association with completing the transaction.

19. The non-transitory computer-readable medium of claim 15, wherein the one or more instructions, when executed by the one or more processors, further cause the one or more processors to:
- determine that an individual associated with the transaction is not registered for the benefit account; and
- provide one or more instructions to the user device to cause a user interface, associated with registering for the benefit account, to be provided for display.

20. The non-transitory computer-readable medium of claim 15, wherein the one or more instructions, when executed by the one or more processors, further cause the one or more processors to:
- determine that an individual associated with the transaction is not registered for the benefit account; and
- provide one or more instructions to the transaction terminal to cause a user interface, associated with registering for the benefit account, to be provided for display.

\* \* \* \* \*